United States Patent
Yang et al.

(10) Patent No.: US 9,859,837 B2
(45) Date of Patent: Jan. 2, 2018

(54) NEGATIVE VOLTAGE PROTECTION SYSTEM FOR REDUCING AN INTENSITY OF NEGATIVE VOLTAGE

(71) Applicant: Prolific Technology Inc., Taipei (TW)

(72) Inventors: Chih-Shih Yang, Hsinchu (TW); Jia-Jun Liu, Hsinchu County (TW); Wan-Yang Chen, Kaohsiung (TW)

(73) Assignee: Prolific Technology Inc., Taipei (TW)

( * ) Notice: Subject to any disclaimer, the term of this patent is extended or adjusted under 35 U.S.C. 154(b) by 0 days.

(21) Appl. No.: 15/367,151

(22) Filed: Dec. 1, 2016

(65) Prior Publication Data
US 2017/0214357 A1 Jul. 27, 2017

(30) Foreign Application Priority Data
Jan. 21, 2016 (TW) .............................. 105101825 A (51) Int. Cl.
*H02P 29/024* (2016.01)
*H02P 29/032* (2016.01)

(52) U.S. Cl.
CPC .......... *H02P 29/024* (2013.01); *H02P 29/032* (2016.02)

(58) Field of Classification Search
CPC ....... G01R 27/2611; G06F 1/26; G06F 1/266; H02J 5/00; H02J 5/005; H02M 1/36; H02M 1/4258; H02M 2001/0058; H02M 2001/0096; H02M 3/33569; H02M 3/33576; H02M 7/53871; H03K 17/302; H03K 19/017; H03K 4/625; H03K 4/64; H03K 4/90

USPC ........................................................... 361/33
See application file for complete search history.

(56) References Cited

U.S. PATENT DOCUMENTS

| | | | | | |
|---|---|---|---|---|---|
| 4,227,139 A | * | 10/1980 | Rosink | .................... | H02P 23/06 318/803 |
| 4,401,934 A | * | 8/1983 | Dolland | .................. | H02P 27/06 318/685 |
| 4,402,029 A | * | 8/1983 | Fujita | ........................ | H03F 1/52 330/207 P |
| 5,075,608 A | * | 12/1991 | Erdman | .................. | F23N 3/082 318/400.22 |
| 5,504,402 A | * | 4/1996 | Menegoli | ............... | G11B 19/20 318/368 |
| 5,543,760 A | * | 8/1996 | Honda | ...................... | H03F 1/52 330/207 P |
| 5,847,910 A | * | 12/1998 | Efantis | ..................... | H02H 7/04 361/36 |

(Continued)

FOREIGN PATENT DOCUMENTS

TW 201519554 A 5/2015
TW 201618449 A 5/2016

*Primary Examiner* — Rita Leykin
(74) *Attorney, Agent, or Firm* — Winston Hsu (57) ABSTRACT

A negative voltage protection system includes a negative voltage comparison circuit, a signal processing circuit, a driving circuit, a driving output circuit, a power device, and a coil module. When the coil module generates a back electromotive force, the coil module outputs a negative voltage. When an intensity of the negative voltage detected by the negative voltage comparison circuit is greater than a predetermined value, the signal processing circuit generates a control signal to the driving circuit. The driving circuit controls the driving output circuit and the power device to reduce the intensity of the negative voltage according to the control signal.

10 Claims, 2 Drawing Sheets

(56) References Cited

U.S. PATENT DOCUMENTS

| | | | | |
|---|---|---|---|---|
| 5,877,914 A * | 3/1999 | Gontowski, Jr. | G11B 21/083 330/267 |
| 5,937,074 A * | 8/1999 | Carver | H03F 1/0227 181/148 |
| 6,229,273 B1 * | 5/2001 | Kelly | G11B 5/5521 318/293 |
| 6,563,284 B2 * | 5/2003 | Teutsch | G05B 11/28 318/599 |
| 6,597,555 B2 * | 7/2003 | Gruening | H02M 1/08 361/100 |
| 6,657,844 B2 * | 12/2003 | Iwazaki | H01F 7/18 361/152 |
| 6,680,598 B2 * | 1/2004 | Galbiati | H02P 25/034 318/299 |
| 7,289,308 B2 * | 10/2007 | Kimura | G05F 1/5735 323/273 |
| 7,375,589 B2 * | 5/2008 | Yasuda | H03F 1/301 330/207 P |
| 7,834,702 B2 * | 11/2010 | Jones | H03F 1/02 330/136 |
| 8,058,853 B2 * | 11/2011 | Murota | H02M 3/158 323/267 |
| 8,183,807 B2 * | 5/2012 | Tsai | H02P 6/18 318/400.01 |
| 8,189,306 B2 * | 5/2012 | Jacobson | H02H 9/08 361/42 |
| 8,385,036 B2 * | 2/2013 | Koch | G06F 13/4081 361/86 |
| 8,471,505 B2 * | 6/2013 | Galbiati | H02P 6/08 318/400.03 |
| 8,570,697 B2 * | 10/2013 | Stevens | H02H 3/20 361/86 |
| 8,604,842 B2 * | 12/2013 | Sato | H03K 17/00 323/315 |
| 9,543,858 B2 * | 1/2017 | Kusumoto | H01L 21/8213 |
| 2015/0194802 A1 * | 7/2015 | Zhu | H04L 25/0272 361/86 |
| 2016/0111989 A1 * | 4/2016 | Gohara | H02P 3/12 318/490 |

\* cited by examiner

NEGATIVE VOLTAGE PROTECTION SYSTEM FOR REDUCING AN INTENSITY OF NEGATIVE VOLTAGE

BACKGROUND OF THE INVENTION

1. Field of the Invention

The present invention illustrates a negative voltage protection system, and more particularly, the negative voltage protection system for reducing an intensity of negative voltage by using a comparison circuit.

2. Description of the Prior Art

With the advancement of techniques, various electrical devices with high operational performance are widely adopted. Nowadays, most electrical devices are required to perform high processing speed and low response time in conjunction with a high-level processor integrated to a micro volume circuit. Thus, the electrical devices can be operated by users at any time and in any place. For example, the specification of iPhone 5s states that an A7-typed processor is used. The specification of iPhone 6 Plus states that an A8-typed processor is used. Another example is that the central processing unit (CPU) of the personal computer is upgraded from Intel® Core™ i5 to Intel® Core™ i7. Specifically, power consumption and heat generation of the electrical device are increased since the clock frequency of the processor is increased. Thus, the performance of heat dissipation components such as heat dissipation fans, a water cooling system, thermally conductive adhesive, and a heat sink attracts more attention. Among these heat dissipation devices, a water cooling system has the best heat dissipation performance yet has a large circuit volume, high cost, and high noise. Thermally conductive adhesives and heat sinks have smaller volume with inferior heat dissipation performance since they only use a medium for conducting heat. As a result, heat dissipation fans become the most popular devices for dissipating heat in general electric devices.

Specifically, in a half-bridge circuit based fan motor circuit, when the fan motor performs a phase alternation process, an effect of negative transient voltage is occurred due to Lenz's law. Unfortunately, when the negative transient voltage exceeds a tolerant voltage, a driving stage of the fan motor circuit suffers a latch-up effect. As known, the latch-up effect can interfere with all operations of fan motor circuit, such as interferences of a driving circuit and a clock circuit. Further, when the fan motor circuit is operated under a short state, an overloading state, or an automatic shutdown state, an effect of the negative transient voltage becomes severe.

To avoid the effect of the negative transient voltage, a limiter is introduced to a level shift driving circuit of the fan motor circuit. By using the limiter, the negative transient voltage and an intensity of an electrostatic discharge can be mitigated. However, practicability of aforementioned method is limited in practice. For example, when a distance between a controller and the fan motor circuit with a large capacitor is very long, the negative transient voltage generated from the fan motor circuit may exceed an amplitude of 100 volts (for example, the negative transient voltage is −120 volts). Thus, the limiter may lose a capability of protecting the fan motor circuit from the effect of the negative transient voltage.

SUMMARY OF THE INVENTION

In an embodiment of the present invention, a negative voltage protection system is disclosed. The negative voltage protection includes a negative voltage comparison circuit, a signal processing circuit, a driving circuit, driving output circuit, a power device, and a coil module. The negative voltage comparison circuit is configured to detect a negative voltage and output a comparison signal. The signal processing circuit is coupled to the negative voltage comparison circuit and configured to generate a control signal according to the comparison signal. The driving circuit is coupled to the signal processing circuit and configured to generate at least one driving signal according to the control signal. The driving output circuit is coupled to the driving circuit and configured to generate at least one power signal according to the at least one driving signal. The power device is coupled to the driving output circuit and configured to generate a driving voltage according to the at least one power signal. The coil module is coupled to the power device and operated according to the driving voltage. When the coil module generates a back electromotive force, the coil module outputs the negative voltage. When an intensity of the negative voltage detected by the negative voltage comparison circuit is greater than a predetermined value, the signal processing circuit generates the control signal to the driving circuit. The driving circuit controls the driving output circuit and the power device to reduce the intensity of the negative voltage according to the control signal.

In another embodiment of the present invention, a negative voltage protection system is disclosed. The negative voltage protection system includes a negative voltage comparison circuit, a signal processing circuit, a driving circuit, a driving output circuit, a power device, and a coil module. The negative voltage comparison circuit is configured to detect a first negative voltage or a second negative voltage and output a plurality of comparison signals. The signal processing circuit is coupled to the negative voltage comparison circuit and configured to generate a plurality of control signals according to the plurality of comparison signals. The driving circuit is coupled to the signal processing circuit and configured to generate a plurality of driving signals according to the plurality of control signals. The driving output circuit is coupled to the driving circuit and configured to generate a plurality of power signals according to the plurality of driving signals. The power device is coupled to the driving output circuit and configured to generate a plurality of driving voltages according to the plurality of power signals. The coil module is coupled to the power device and operated according to the plurality of driving voltages. When the coil module generates a back electromotive force, the coil module outputs the first negative voltage or the second negative voltage. When an intensity of the first negative voltage or the second negative voltage detected by the negative voltage comparison circuit is greater than a predetermined value, the signal processing circuit generates the plurality of control signals to the driving circuit. The driving circuit controls the driving output circuit and the power device to reduce the intensity of the first negative voltage or the second negative voltage according to the plurality of control signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
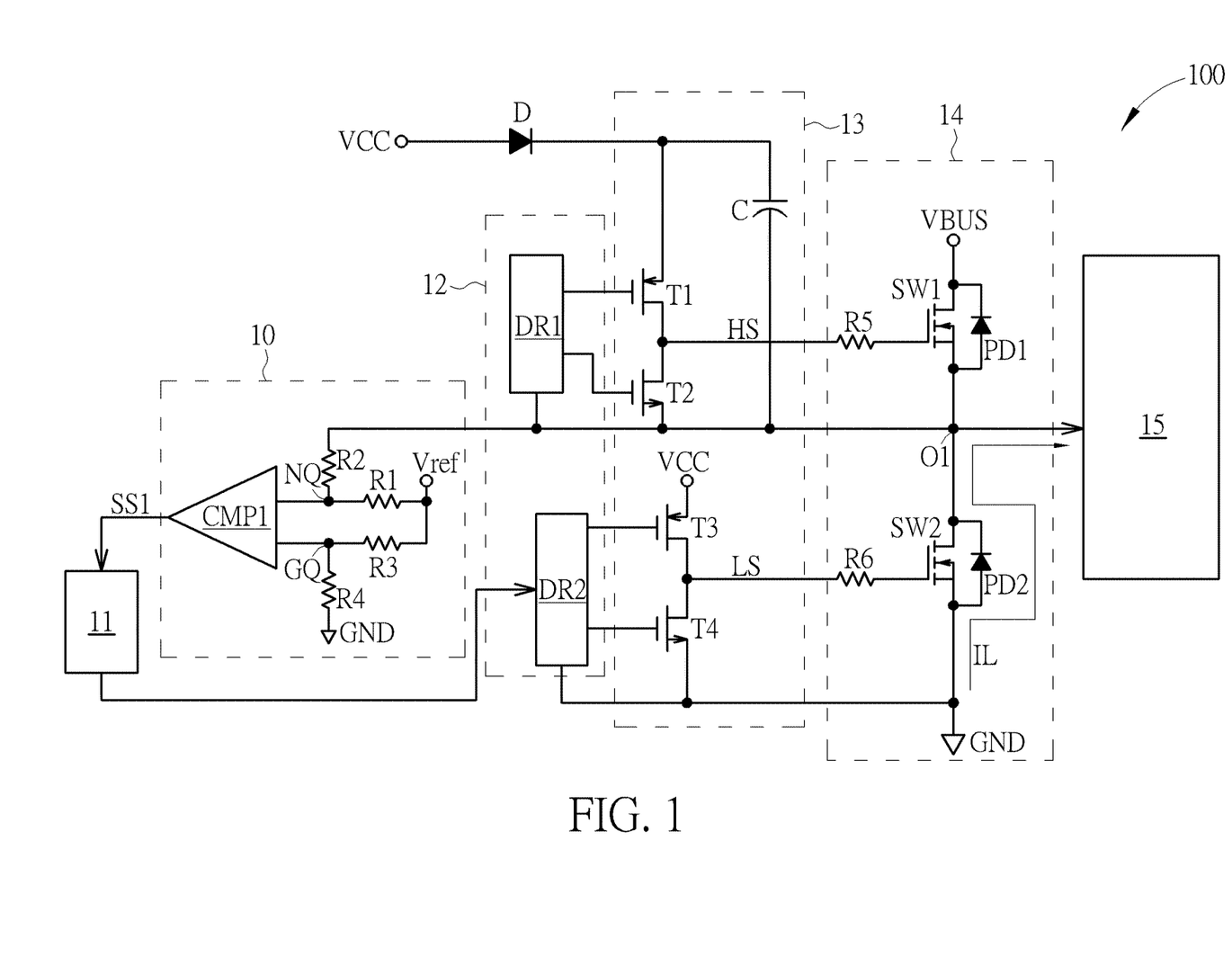
FIG. 1 illustrates a circuit structure of a negative voltage protection system according to a first embodiment of the present invention.

FIG. 1 illustrates a circuit structure of a negative voltage protection system 100. The negative voltage protection system 100 includes a negative voltage comparison circuit 10, a signal processing circuit 11, a driving circuit 12, a driving output circuit 13, a power device 14, and a coil module 15. The negative voltage comparison circuit 10 includes a first resistor R1, a second resistor R2, a third resistor R3, a fourth resistor R4, and a comparator CMP1. The first resistor R1 includes a first terminal configured to receive a reference voltage Vref, and a second terminal. The second resistor R2 includes a first terminal configured to receive a negative voltage, and a second terminal coupled to the second terminal of the first resistor R1. The third resistor R3 includes a first terminal coupled to the first terminal of the first resistor R1, and a second terminal. The fourth resistor R4 includes a first terminal coupled to the second terminal of the third resistor R3, and a second terminal coupled to a ground terminal GND. The comparator CMP1 includes a first input terminal coupled to the second terminal of the second resistor R2, a second input terminal coupled to the first terminal of the fourth resistor R4, and an output terminal coupled to the signal processing circuit 11 and configured to output a comparison signal SS1 to the signal processing circuit 11. An operation mode of the negative voltage comparison circuit 10 is illustrated below. The first terminal of the second resistor R2 receives the negative voltage (i.e., the negative voltage is illustrated later). Thus, a voltage of a node NQ can be regarded as a partitioned voltage between the negative voltage and the reference voltage Vref. Similarly, a voltage of a node GQ can be regarded as a partitioned voltage between a voltage of the ground terminal GND and the reference voltage Vref. In the negative voltage protection system 100, when an intensity of the negative voltage is greater than a predetermined value, the comparator CMP1 outputs a comparison signal SS1 with a first voltage level. Contrarily, when the intensity of the negative voltage is smaller than the predetermined value, the comparator CMP1 outputs the comparison signal SS1 with a second voltage level. Here, the intensity of the negative voltage can be defined as an absolute value of the negative voltage. For example, an intensity of −7 volts is greater than an intensity of −1 volt. The comparison signal SS1 with the first voltage level or the second voltage level is transmitted to the signal processing circuit 11. In the negative voltage protection system 100, the signal processing circuit 11 can modulate the comparison signal SS1. For example, the signal processing circuit 11 can modulate the comparison signal SS1 to an ON-OFF signal, a bipolar signal, or a unipolar signal. The modulated comparison signal can be regarded as a control signal. The control signal is transmitted from the signal processing circuit 11 to the driving circuit 12.

In the negative voltage protection system 100, the driving circuit 12 includes a first driving unit DR1 and a second driving unit DR2. The first driving unit DR1 includes a first terminal, a second terminal, and a third terminal coupled to the first terminal of the second resistor R2. The second driving unit DR2 includes a first terminal, a second terminal, a third terminal coupled to a ground terminal GND, and fourth terminal coupled to the signal processing circuit 11 and configured to receive the control signal. The driving circuit 12 generates at least one driving signal to the driving output circuit 13 according to the control signal. For example, the first terminal of the first driving unit DR1, the second terminal of the first driving unit DR1, the first terminal of the second driving unit DR2, and the second terminal of the second driving unit DR2 generate four driving signals to the driving output circuit 13. The driving output circuit 13 includes a first transistor T1, a second transistor T2, a third transistor T3, and a fourth transistor T4. The first transistor T1 includes a first terminal configured to receive a first circuit voltage, a second terminal, and a control terminal coupled to the first terminal of the first driving unit DR1. Specifically, a second circuit voltage VCC becomes the first circuit voltage by passing through a diode D. When the diode D is operated in a forward current state, the first circuit voltage received by the first terminal of the first transistor T1 is substantially equal to the second circuit voltage VCC. The second transistor T2 includes a first terminal coupled to the second terminal of the first transistor T1, a second terminal coupled to the first terminal of the second resistor R2, and a control terminal coupled to the second terminal of the first driving unit DR1. The third transistor T3 includes a first terminal configured to receive a second circuit voltage VCC, a second terminal, and a control terminal coupled to the first terminal of the second driving unit DR2. The fourth transistor T4 includes a first terminal coupled to the second terminal of the third transistor T3, a second terminal coupled to the third terminal of the second driving unit DR2, and a control terminal coupled to the second terminal of the second driving unit DR2. In the driving output circuit 13, the first terminal of the second transistor T2 and the first terminal of the fourth transistor T4 output at least one power signal to the power device 14. For example, the first terminal of the second transistor T2 outputs a power signal HS to the power device 14. The first terminal of the fourth transistor T4 outputs a power signal LS to the power device 14. The power device 14 includes a fifth resistor R5, a sixth resistor R6, a first switch SW1, and a second switch SW2. The fifth resistor R5 includes a first terminal coupled to the first terminal of the second transistor T2, and a second terminal. The sixth resistor R6 includes a first terminal coupled to the first terminal of the fourth transistor T4, and a second terminal. The first switch SW1 includes a first terminal configured to receive a bus voltage VBUS, a second terminal coupled to the first terminal of the second resistor R2 and configured to output the driving voltage to the coil module 15, and a control terminal coupled to the second terminal of the fifth resistor R5. The second switch SW2 includes a first terminal coupled to the second terminal of the first switch SW1, a second terminal coupled to the third terminal of the second driving unit DR2, and a control terminal coupled to the second terminal of the sixth resistor R6. The coil module 15 can be any typed coil module, such as a coil module of brushless fan. The first switch SW1 and the second switch SW2 can be two N-type metal-oxide-semiconductor field-effect transistors. Specifically, two parasitic diodes with respect to the first switch SW1 and the second switch SW2 are denoted as a parasitic diode PD1 and a parasitic diode PD2 respectively. A method for reducing the intensity of the negative voltage is illustrated below.

For presentation completeness, all operational modes of the coil module 15 at all-time points and the operational method for reducing the intensity of the negative voltage are described. Initially, the first switch SW1 is operated in short state. The second switch SW2 is operated in open state. Then, the first switch SW1 becomes open state. The second switch SW2 maintains open state. At the moment, the coil module 15 generates a back electromotive force. As a result, a current IL is transmitted from the ground terminal GND to the coil module 15 through the parasitic diode PD2. Since the current IL is transmitted from a high voltage terminal to a low voltage terminal inherently, equivalently, when the ground terminal GND is regarded as a terminal with zero voltage, a node O1 becomes a terminal with a negative voltage. When the negative voltage exceeds a tolerant voltage, all circuit components and driving signals suffer severe interferences or disturbances, leading to a short circuit effect (i.e., large current short circuit). Thus, the coil module 15 may be burned out. To avoid high intensity of the negative voltage, the comparator CMP1 of the negative voltage comparison circuit 10 may compare a voltage of the node NQ and a voltage of the node GQ. As with the aforementioned illustration, a voltage of the node NQ can be regarded as a partitioned voltage between the negative voltage (i.e., a voltage of the node O1) and the reference voltage Vref. Similarly, a voltage of the node GQ can be regarded as a partitioned voltage between a voltage of the ground terminal GND and the reference voltage Vref. Thus, when the intensity of the negative voltage (i.e., for example, −7 volts) is greater than the predetermined value (i.e., for example, −3 volts), the comparator CMP1 outputs a comparison signal SS1 with the first voltage level. Contrarily, when the intensity of the negative voltage (i.e., for example, −0.5 volt) is smaller than the predetermined value (i.e., for example, −3 volts), the comparator CMP1 outputs the comparison signal SS1 with a second voltage level. The comparison signal SS1 is modulated to become a control signal by using the signal processing circuit 11 for controlling the driving circuit 12. For example, when the intensity of the negative voltage is large, the control signal corresponding to the comparison signal SS1 with the first voltage level can operate the driving circuit 12, the driving output circuit 13, and the power device 14 to control the second switch SW2 to operate in a short state. When the second switch SW2 is controlled to operate in the short state, the node O1 becomes the ground terminal. Thus, the intensity of the negative voltage can be reduced or eliminated. Contrarily, when the intensity of the negative voltage is small, the control signal corresponding to the comparison signal SS1 with the second voltage level can maintain the second switch SW2 to operate in an open state.

In other words, when the intensity of the negative voltage exceeds a predetermined value, the second switch SW2 is operated in the short state. Thus, since the transmission path of the current IL from the ground terminal GND to the coil module 15 is dissipated, the intensity of the negative voltage can be reduced or eliminated. As a result, since the negative voltage protection system 100 can reduce or eliminate large negative voltage, the negative voltage protection system 100 has a capability of circuit protection.

Figure 2:
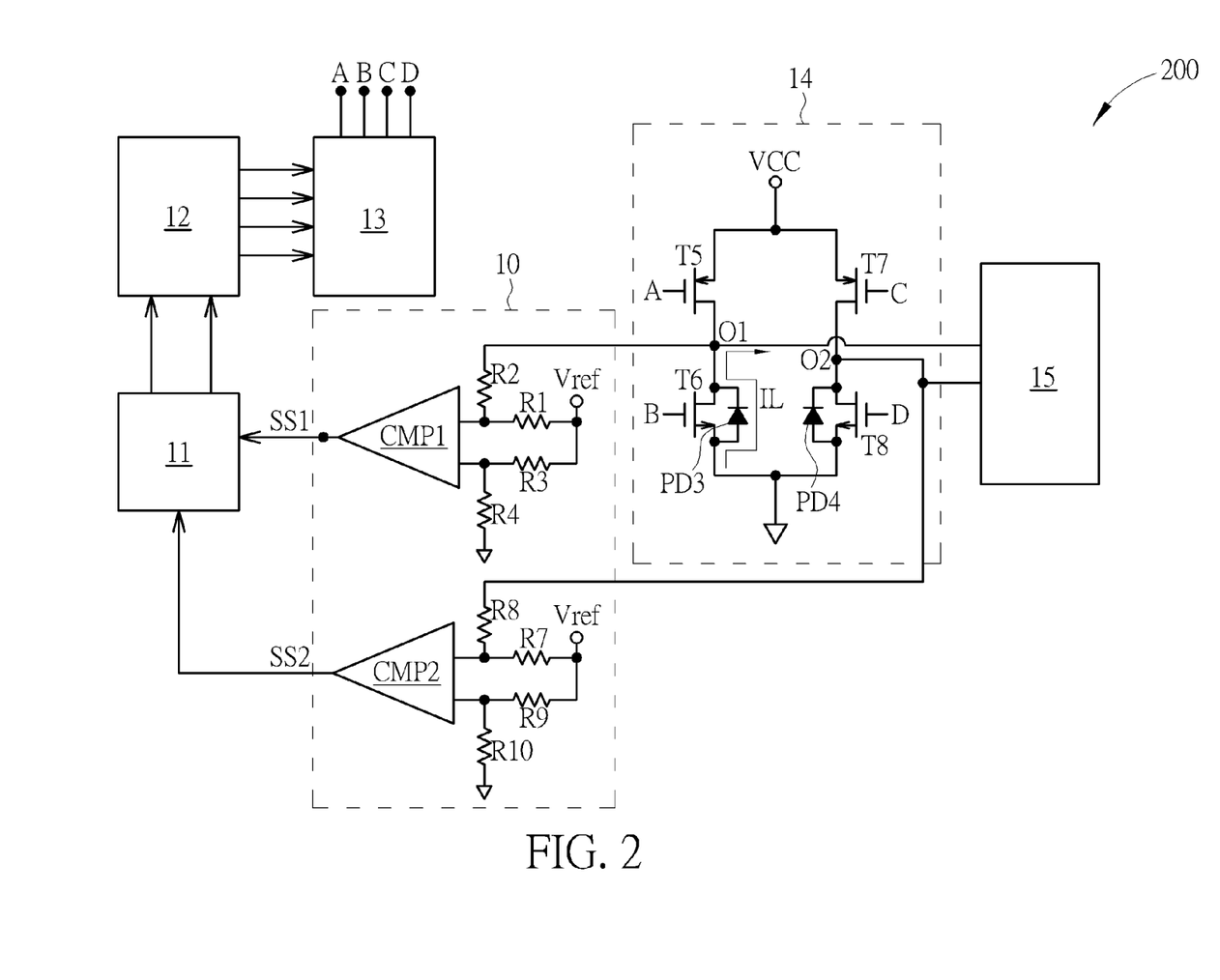
FIG. 2 illustrates a circuit structure of a negative voltage protection system according to a second embodiment of the present invention.

FIG. 2 illustrates a circuit structure of a negative voltage protection system 200. The negative voltage protection system 200 includes a negative voltage comparison circuit 10, a signal processing circuit 11, a driving circuit 12, a driving output circuit 13, a power device 14, and a coil module 15. The negative voltage comparison circuit 10 is used for detecting a first negative voltage (i.e., a negative voltage of a node O1) or a second negative voltage (i.e., a negative voltage of a node O2) and outputting a plurality of comparison signals. The signal processing circuit 11 is coupled to the negative voltage comparison circuit 10 for generating a plurality of control signals according to the plurality of comparison signals. The driving circuit 12 is coupled to the signal processing circuit 11 for generating a plurality of driving signals according to the plurality of control signals. The driving output circuit 13 is coupled to the driving circuit 12 for generating a plurality of power signals according to the plurality of driving signals. The power device 14 is coupled to the driving output circuit 13 for generating a plurality of driving voltages according to the plurality of power signals. A coil module 15 is coupled to the power device 14 and operated according to the plurality of driving voltages. In the negative voltage protection system 200, the negative voltage comparison circuit 10 includes a first resistor R1, a second resistor R2, a third resistor R3, a fourth resistor R4, a seventh resistor R7, an eighth resistor R8, a ninth resistor R9, a tenth resistor R10, a first comparator CMP1, and a second comparator CMP2. Here, a circuit structure including the first resistor R1, the second resistor R2, the third resistor R3, the fourth resistor R4, and the first comparator CMP1 is similar to the negative voltage comparison circuit 10 in the negative voltage protection system 100. Specifically, a first terminal of the second resistor R2 is coupled to a first terminal of the coil module 15 for receiving the first negative voltage of the node O1. An output terminal of the first comparator CMP1 is used for outputting the first comparison signal SS1 to a first input terminal of the signal processing circuit 11. Further, a circuit structure including the seventh resistor R7, the eighth resistor R8, the ninth resistor R9, the tenth resistor R10, and the second comparator CMP2 is similar to the circuit structure including the first resistor R1, the second resistor R2, the third resistor R3, the fourth resistor R4, and the first comparator CMP1. Specifically, a first terminal of the eighth resistor R8 is coupled to a second terminal of the coil module 15 for receiving the second negative voltage of the node O2. An output terminal of the second comparator CMP2 is used for outputting the second comparison signal SS2 to a second input terminal of the signal processing circuit 11. In the negative voltage protection system 200, when an intensity of the first negative voltage is greater than a predetermined value, the first comparator CMP1 outputs the first comparison signal SS1 with a first voltage level. When the intensity of the first negative voltage is smaller than the predetermined value, the first comparator CMP1 outputs the first comparison signal SS1 with a second voltage level. Similarly, when an intensity of the second negative voltage is greater than a predetermined value, the second comparator CMP2 outputs the second comparison signal SS2 with a first voltage level. When the intensity of the second negative voltage is smaller than the predetermined value, the second comparator CMP2 outputs the second comparison signal SS2 with a second voltage level. Here, the intensity of the negative voltage can be defined as an absolute value of the negative voltage. For example, an intensity of −7 volts is greater than an intensity of −1 volt. The first comparison signal SS1 and the second comparison signal SS2 (i.e., with the first voltage level or the second voltage level) are transmitted to the signal processing circuit 11. In the negative voltage protection system 200, the signal processing circuit 11 can modulate the first comparison signal SS1 and the second comparison signal SS2. For example, the signal processing circuit 11 can modulate the first comparison signal SS1 and the second comparison signal SS2 to two ON-OFF signals, two bipolar signals, or two unipolar signals. The modulated comparison signals can be regarded as two control signals. The control signals are transmitted from the signal processing circuit 11 to the driving circuit 12.

In the negative voltage protection system 200, the driving circuit 12 generates a plurality of driving signals to the driving output circuit 13 according to the control signals. The driving output circuit 13 generates a plurality of power signals to the power device 14 according to the driving signals. For example, the driving output circuit 13 generates four power signals to the nodes A to D. In other words, a first output terminal of the driving output circuit 13 is coupled to the node A. A second output terminal of the driving output circuit 13 is coupled to the node B. A third output terminal of the driving output circuit 13 is coupled to the node C. A fourth output terminal of the driving output circuit 13 is coupled to the node D. The power device 14 includes a fifth transistor T5, a sixth transistor T6, a seventh transistor T7, and an eighth transistor T8. The fifth transistor T5 includes a first terminal configured to receive a circuit voltage VCC, a second terminal configured to receive the first terminal (i.e., node O1) of the second resistor R2, and a control terminal coupled to the first output terminal (i.e., node A) of the driving output circuit 13. The sixth transistor T6 includes a first terminal coupled to the second terminal of the fifth transistor T5, a second terminal coupled to a ground terminal GND, and a control terminal coupled to a second output terminal (i.e., node B) of the driving output circuit 13. The seventh transistor T7 includes a first terminal configured to receive the circuit voltage VCC, a second terminal coupled to the first terminal (i.e., node O2) of the eighth resistor R8, and a control terminal coupled to a third output terminal (i.e., node C) of the driving output circuit 13. The eighth transistor T8 includes a first terminal coupled to the second terminal of the seventh transistor T7, a second terminal coupled to the second terminal of the sixth transistor T6, and a control terminal coupled to a fourth output terminal (i.e., node D) of the driving output circuit 13. Particularly, the first terminal of the sixth transistor T6 and the first terminal of the eighth transistor T8 are used for outputting driving voltages to the coil module 15 in order to operate the coil module 15. The coil module 15 can be any typed coil module, such as a coil module of brushless fan. The power device 14 can be abridge circuit-based power device. A parasitic diode PD3 corresponds to the sixth transistor T6. A parasitic diode PD4 corresponds to the eighth transistor T8. A method for reducing the intensity of the negative voltage is illustrated below.

For presentation completeness, all operational modes of the coil module 15 at all-time points and the operational method for reducing the intensity of the negative voltage are described. Initially, the fifth transistor T5 and the eighth transistor T8 are operated in a short state. The sixth transistor T6 and the seventh transistor T7 are operated in open state. At the moment, a current is transmitted from the fifth transistor T5 to the eighth transistor T8. Then, the fifth transistor T5, the sixth transistor T6, the seventh transistor T7, and the eighth transistor T8 become an open state. Thus, the coil module 15 generates a back electromotive force. As a result, a current IL is transmitted from the ground terminal GND to the node O1 of the coil module 15 through the parasitic diode PD3. Since the current IL is transmitted from a high voltage terminal to a low voltage terminal inherently, equivalently, when the ground terminal GND is regarded as a terminal with zero voltage, the node O1 becomes a terminal with a first negative voltage. When the first negative voltage exceeds a tolerant voltage, all circuit components and driving signals suffer severe interferences or disturbances, leading to a short circuit effect (i.e., large current short circuit). Thus, the coil module 15 may be burned out. To avoid high intensity of the first negative voltage, similar to operations of the negative voltage protection system 100, the first comparator CMP1 of the negative voltage protection system 200 compares a partitioned voltage between the first negative voltage and a reference voltage Vref, with a partitioned voltage between a voltage of ground terminal GND and the reference voltage Vref. Thus, when the intensity of the first negative voltage (i.e., for example, −7 volts) is greater than the predetermined value (i.e., for example, −3 volts) the first comparator CMP1 outputs a first comparison signal SS1 with a first voltage level. Here, when a voltage of the node O2 is normal, the second comparator CMP2 outputs a second comparison signal SS2 with a second voltage level. The first comparison signal SS1 and the second comparison signal SS2 are modulated to become two control signals by using the signal processing circuit 11 for controlling the driving circuit 12. For example, when the intensity of the first negative voltage is large, the control signal corresponding to the first comparison signal SS1 with the first voltage level can operate the driving circuit 12, the driving output circuit 13, and the power device 14 to control the sixth transistor T6 to operate in a short state. When the sixth transistor T6 is controlled to operate in the short state, the node O1 becomes the ground terminal GND. Thus, the intensity of the first negative voltage can be reduced or eliminated. Contrarily, when the intensity of the first negative voltage is small, the control signal corresponding to the first comparison signal SS1 with the second voltage level maintains the sixth transistor T6 to operate in an open state.

Afterward (i.e., in next phase), the sixth transistor T6 and the seventh transistor T7 become a short state. The fifth transistor T5 and the eighth transistor T8 become an open state. At the moment, a current is transmitted from the seventh transistor T7 to the sixth transistor T6. Then, the fifth transistor T5, the sixth transistor T6, the seventh transistor T7, and the eighth transistor T8 become an open state. Thus, the coil module 15 generates a back electromotive force. As a result, a current IL is transmitted from the ground terminal GND to the node O2 of the coil module 15 through the parasitic diode PD4. Since the current IL is transmitted from a high voltage terminal to a low voltage terminal inherently, equivalently, when the ground terminal GND is regarded as a terminal with zero voltage, the node O2 becomes a terminal with a second negative voltage. When the second negative voltage exceeds a tolerant voltage (i.e., a predetermined value), the second comparator CMP2 outputs a second comparison signal SS2 with a first voltage level. Here, when a voltage of the node O1 is normal, the first comparator CMP1 outputs a first comparison signal SS1 with a second voltage level. The first comparison signal SS1 and the second comparison signal SS2 are modulated to become two control signals by using the signal processing circuit 11 for controlling the driving circuit 12. For example, when the intensity of the second negative voltage is large, the control signal corresponding to the second comparison signal SS2 with the first voltage level can operate the driving circuit 12, the driving output circuit 13, and the power device 14 to control the eighth transistor T8 to operate in a short state. When the eighth transistor T8 is controlled to operate in the short state, the node O2 becomes the ground terminal. Thus, the intensity of the second negative voltage can be reduced or eliminated. Contrarily, when the intensity of the second negative voltage is small, the control signal corresponding to the second comparison signal SS2 with the second voltage level maintains the eighth transistor T8 to operate in an open state.

In other words, when the intensity of the first negative voltage or the second negative voltage is greater than a predetermined value, a corresponding transistor is operated in the short state. Thus, since the transmission path of the current IL from the ground terminal GND to the coil module 15 is dissipated, the intensity of the first negative voltage and/or the second negative voltage can be reduced or eliminated. As a result, since the negative voltage protection system 200 can reduce or eliminate large negative voltage, the negative voltage protection system 200 has a capability of circuit protection.

To sum up, the present invention discloses a negative voltage protection system. The method for protecting circuit components from a negative voltage is to detect the negative voltage generated by a current which is transmitted from a ground terminal to a coil module through a parasitic diode. When an intensity of the negative voltage is greater than a predetermined value, the negative voltage protection system controls a corresponding transistor to operate in the short state. Thus, the negative voltage can be reduced or eliminated. As a result, since the negative voltage protection system of the present invention can avoid large negative voltage, the negative voltage protection system has a capability of circuit protection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A negative voltage protection system comprising:
    a negative voltage comparison circuit configured to detect a negative voltage and output a comparison signal;
    a signal processing circuit coupled to the negative voltage comparison circuit and configured to generate a control signal according to the comparison signal;
    a driving circuit coupled to the signal processing circuit and configured to generate at least one driving signal according to the control signal;
    a driving output circuit coupled to the driving circuit and configured to generate at least one power signal according to the at least one driving signal;
    a power device coupled to the driving output circuit and configured to generate a driving voltage according to the at least one power signal; and
    a coil module coupled to the power device and operated according to the driving voltage;
    wherein when the coil module generates a back electromotive force, the coil module outputs the negative voltage, when an intensity of the negative voltage detected by the negative voltage comparison circuit is greater than a predetermined value, the signal processing circuit generates the control signal to the driving circuit, and the driving circuit controls the driving output circuit and the power device to reduce the intensity of the negative voltage according to the control signal.

2. The system of claim 1, wherein the negative voltage comparison circuit comprises:
    a first resistor comprising:
        a first terminal configured to receive a reference voltage; and
        a second terminal;
    a second resistor comprising:
        a first terminal configured to receive the negative voltage; and
        a second terminal coupled to the second terminal of the first resistor;
    a third resistor comprising:
        a first terminal coupled to the first terminal of the first resistor; and
        a second terminal;
    a fourth resistor comprising:
        a first terminal coupled to the second terminal of the third resistor; and
        a second terminal coupled to a ground terminal; and
    a comparator comprising:
        a first input terminal coupled to the second terminal of the second resistor;
        a second input terminal coupled to the first terminal of the fourth resistor; and
        an output terminal coupled to the signal processing circuit and configured to output the comparison signal to the signal processing circuit.

3. The system of claim 2, wherein the driving circuit comprises:
    a first driving unit comprising:
        a first terminal;
        a second terminal; and
        a third terminal coupled to the first terminal of the second resistor; and
    a second driving unit comprising:
        a first terminal;
        a second terminal;
        a third terminal coupled to a ground terminal; and
        a fourth terminal coupled to the signal processing circuit and configured to receive the control signal;
    wherein the first terminal of the first driving unit, the second terminal of the first driving unit, the first terminal of the second driving unit, and the second terminal of the second driving unit generate the at least one driving signal to the driving output circuit.

4. The system of claim 3, wherein the driving output circuit comprises:
    a first transistor comprising:
        a first terminal configured to receive a first circuit voltage;
        a second terminal; and
        a control terminal coupled to the first terminal of the first driving unit;
    a second transistor comprising:
        a first terminal coupled to the second terminal of the first transistor;
        a second terminal coupled to the first terminal of the second resistor; and
        a control terminal coupled to the second terminal of the first driving unit;
    a third transistor comprising:
        a first terminal configured to receive a second circuit voltage;
        a second terminal; and
        a control terminal coupled to the first terminal of the second driving unit; and
    a fourth transistor comprising:
        a first terminal coupled to the second terminal of the third transistor;
        a second terminal coupled to the third terminal of the second driving unit; and
        a control terminal coupled to the second terminal of the second driving unit;
    wherein the first terminal of the second transistor and the first terminal of the fourth transistor output the at least one power signal to the power device.

5. The system of claim 4, wherein the power device comprises:
    a fifth resistor comprising:

a first terminal coupled to the first terminal of the second transistor; and
a second terminal;
a sixth resistor comprising:
a first terminal coupled to the first terminal of the fourth transistor; and
a second terminal;
a first switch comprising:
a first terminal configured to receive a bus voltage;
a second terminal coupled to the first terminal of the second resistor and configured to output the driving voltage to the coil module; and
a control terminal coupled to the second terminal of the fifth resistor; and
a second switch comprising:
a first terminal coupled to the second terminal of the first switch;
a second terminal coupled to the third terminal of the second driving unit; and
a control terminal coupled to the second terminal of the sixth resistor.

6. The system of claim 5, wherein the first switch and the second switch are two N-type metal-oxide-semiconductor field-effect transistors.

7. A negative voltage protection system comprising:
a negative voltage comparison circuit configured to detect a first negative voltage or a second negative voltage and output a plurality of comparison signals;
a signal processing circuit coupled to the negative voltage comparison circuit and configured to generate a plurality of control signals according to the plurality of comparison signals;
a driving circuit coupled to the signal processing circuit and configured to generate a plurality of driving signals according to the plurality of control signals;
a driving output circuit coupled to the driving circuit and configured to generate a plurality of power signals according to the plurality of driving signals;
a power device coupled to the driving output circuit and configured to generate a plurality of driving voltages according to the plurality of power signals; and
a coil module coupled to the power device and operated according to the plurality of driving voltages;
wherein when the coil module generates a back electromotive force, the coil module outputs the first negative voltage or the second negative voltage, when an intensity of the first negative voltage or the second negative voltage detected by the negative voltage comparison circuit is greater than a predetermined value, the signal processing circuit generates the plurality of control signals to the driving circuit, and the driving circuit controls the driving output circuit and the power device to reduce the intensity of the first negative voltage or the second negative voltage according to the plurality of control signals.

8. The system of claim 7, wherein the negative voltage comparison circuit comprises:
a first resistor comprising:
a first terminal configured to receive a reference voltage; and
a second terminal;
a second resistor comprising:
a first terminal coupled to a first terminal of the coil module and configured to receive the first negative voltage; and
a second terminal coupled to the second terminal of the first resistor;
a third resistor comprising:
a first terminal coupled to the first terminal of the first resistor; and
a second terminal;
a fourth resistor comprising:
a first terminal coupled to the second terminal of the third resistor; and
a second terminal coupled to a ground terminal;
a first comparator comprising:
a first input terminal coupled to the second terminal of the second resistor;
a second input terminal coupled to the first terminal of the fourth resistor; and
an output terminal configured to output a first comparison signal to a first input terminal of the signal processing circuit;
a seventh resistor comprising:
a first terminal configured to receive the reference voltage; and
a second terminal;
an eighth resistor comprising:
a first terminal coupled to a second terminal of the coil module and configured to receive the second negative voltage; and
a second terminal coupled to the second terminal of the seventh resistor;
a ninth resistor comprising:
a first terminal coupled to the first terminal of the seventh resistor; and
a second terminal;
a tenth resistor comprising:
a first terminal coupled to the second terminal of the ninth resistor; and
a second terminal coupled to a ground terminal; and
a second comparator comprising:
a first input terminal coupled to the second terminal of the eighth resistor;
a second input terminal coupled to the first terminal of the tenth resistor; and
an output terminal configured to output a second comparison signal to a second input terminal of the signal processing circuit.

9. The system of claim 8, wherein the power device comprises:
a fifth transistor comprising:
a first terminal configured to receive a circuit voltage;
a second terminal configured to receive the first terminal of the second resistor; and
a control terminal coupled to a first output terminal of the driving output circuit;
a sixth transistor comprising:
a first terminal coupled to the second terminal of the fifth transistor;
a second terminal coupled to a ground terminal; and
a control terminal coupled to a second output terminal of the driving output circuit;
a seventh transistor comprising:
a first terminal configured to receive the circuit voltage;
a second terminal coupled to the first terminal of the eighth resistor; and
a control terminal coupled to a third output terminal of the driving output circuit; and
an eighth transistor comprising:
a first terminal coupled to the second terminal of the seventh transistor;
a second terminal coupled to the second terminal of the sixth transistor; and a control terminal coupled to a fourth output terminal of the driving output circuit;

wherein the first terminal of the sixth transistor and the first terminal of the eighth transistor output the plurality of driving voltages to the coil module.

10. The system of claim 7, wherein the power device is a bridge circuit-based power device.

\* \* \* \* \*